United States Patent
Mutz et al.

(10) Patent No.: US 12,320,722 B2
(45) Date of Patent: Jun. 3, 2025

(54) COIL ARRANGEMENT AND TORQUE SENSOR WITH COIL ARRANGEMENT

(71) Applicant: NCTE AG, Oberhaching (DE)

(72) Inventors: Robert Mutz, Grünwald (DE); Bernhard Mayr, Munich (DE)

(73) Assignee: NCTE AG, Oberhaching (DE)

(*) Notice: Subject to any disclaimer, the term of this patent is extended or adjusted under 35 U.S.C. 154(b) by 419 days.

(21) Appl. No.: 17/890,788

(22) Filed: Aug. 18, 2022

(65) Prior Publication Data

US 2023/0068057 A1   Mar. 2, 2023

(30) Foreign Application Priority Data

Aug. 27, 2021 (EP) ..................... 21193458

(51) Int. Cl.
*G01L 3/10* (2006.01)
*G01L 5/00* (2006.01)
*H01F 27/28* (2006.01)

(52) U.S. Cl.
CPC ............ *G01L 3/102* (2013.01); *G01L 5/0042* (2013.01); *H01F 27/28* (2013.01)

(58) Field of Classification Search
CPC ........ G01L 3/102; G01L 5/0042; H01F 27/28
See application file for complete search history.

(56) References Cited

U.S. PATENT DOCUMENTS

| | | | | |
|---|---|---|---|---|
| 6,978,686 B2 * | 12/2005 | Shimizu | ................... | G01L 3/105 73/862.335 |
| 8,478,560 B2 * | 7/2013 | Fox | ...................... | G01D 5/2216 324/207.17 |
| 9,558,880 B2 * | 1/2017 | Schreiter | ............. | H01F 27/2823 |
| 11,473,986 B2 * | 10/2022 | Taneda | ...................... | G01L 5/04 |
| 2004/0050181 A1 | 3/2004 | Shimizu et al. | | |
| 2011/0308330 A1 | 12/2011 | May | | |
| 2012/0185207 A1 | 7/2012 | Fox et al. | | |

FOREIGN PATENT DOCUMENTS

EP       3050790 B1    5/2018
EP       4116688 A1    1/2023

* cited by examiner

*Primary Examiner* — Freddie Kirkland, III
(74) *Attorney, Agent, or Firm* — Young Basile Hanlon & MacFarlane, P.C.

(57) ABSTRACT

A coil arrangement has a first cylindrical coil having a first winding direction and a second cylindrical coil having a second winding direction. The first and second cylindrical coils are arranged in longitudinal succession aligned on a common axis. Mutually adjacent ends of the first and second cylindrical coils are electrically connected to each other, and the second winding direction is opposed to the first winding direction.

13 Claims, 6 Drawing Sheets

COIL ARRANGEMENT AND TORQUE SENSOR WITH COIL ARRANGEMENT

CROSS-REFERENCE TO RELATED APPLICATION(S)

This application claims priority to European Patent Application Serial No. 21193458.3, filed Aug. 27, 2021, the entire disclosure of which is hereby incorporated by reference.

TECHNICAL FIELD

The invention relates to a coil arrangement and a torque sensor comprising a coil arrangement.

BACKGROUND

Torque sensors based on the principle of the inverse magnetostrictive effect are known, as disclosed for example in EP 3 050 790 B1. In this process, a magnetized shaft generates a corresponding magnetic field outside the shaft as a function of an applied torque, which can be detected contactless by a magnetic field sensor. In particular, there can advantageously be used two shaft regions magnetized oppositely in the circumferential direction, which improves the measuring accuracy and facilitates compensation of the disturbing influence of external magnetic fields, with a measuring coil being arranged in each case in the vicinity of a respective magnetized shaft region. Using these measuring coils, for example, magnetic fields generated by shaft torsion can be detected in the axial direction of the shaft.

Measuring magnetic field change by a torque can be achieved by measuring coils in a measuring circuit, which are affected by the changing magnetic field. These are mounted contactlessly in relation to the magnetized shaft (e.g. parallel to the axis of rotation) and detect magnetic field changes occurring under load due to inverse magnetostriction. The magnetic field change is usually directly proportional to the external force applied and produces the relationship with the torque. For this purpose, a one-time calibration is performed during the manufacturing phase of the torque sensor.

During calibration, there is also taken into account a constant residual magnetic field present at the measuring position from the magnetized shaft without applied torque by fixing the zero point of a magnetic field-torque value curve, so that the torque value zero is assigned to this residual magnetic field.

Yet, as already mentioned, during torque measurement there may arise magnetic interference fields, either permanent or only intermittent, which distort the measurement. For example, the earth's magnetic field can be a disturbing magnetic field source, both constant and variable. In the case of a vehicle with such a torque sensor, there can occur disturbance which is variable, for example, when passing objects which change the earth's magnetic field, such as parked or moving vehicles.

Nevertheless, such a coil arrangement known from the prior art having two coils arranged longitudinally adjacent to each other and two corresponding oppositely magnetized regions will indicate the hereinafter specified disadvantages. Two coils of the same type are connected to compensate for an external field in such a way that when there is applied a measuring voltage, the measuring current in the coils runs in different directions. Hence, for example, the mutually adjacent contacts of the two coils would have to be connected to one pole of the measuring circuit and the respective outer contacts to the other pole of the measuring circuit.

Compensation works best when the external field in both coils has as equal an influence as possible. A key factor here is that the two coils are precisely aligned with each other and remain on a straight line.

The circuitry described (in particular the contacting at the inner ends of the two coils) requires a great deal of effort to align the two coils precisely enough to ensure the accuracy of the compensation of the external field.

SUMMARY

It is the underlying object of the present invention to eliminate at least partially said disadvantages.

Said object is solved by a coil arrangement according to the invention, in particular a measuring coil arrangement for detecting a magnetic field.

The coil arrangement of the invention comprises a first cylindrical coil having a first winding direction; a second cylindrical coil having a second winding direction; wherein the first and second cylindrical coils are arranged in longitudinal succession aligned on a common axis; wherein mutually adjacent ends of the first and second cylindrical coils are electrically connected to each other; and wherein the second winding direction is opposed to the first winding direction.

As a result of both cylindrical coils being wound oppositely (opposed to each other, mirrored), it is not necessary to make a contact in the middle between the two coils, but the inner ends of the two coils are directly connected to each other in an electrically conductive manner. A measuring voltage only needs to be applied to the two outer ends facing away from each other. The effect of an external magnetic field has the opposite effect due to the different direction of rotation of the two cylindrical coils and leads to the desired compensation of the external magnetic field.

The coil arrangement according to the present disclosure may be further developed as follows hereinafter.

A further development consists in further providing a stabilizing body for stabilizing the alignment of the first and second cylinder coils with respect to each other on the common axis, wherein the stabilizing body is preferably made of plastic material, and wherein the stabilizing body preferably has a constant cross-section along its length.

This has the advantage that the position of the two cylinder coils in relation to each other can be fixed on the common axis (straight line). Plastic material has the advantage of having no magnetic effect and does not affect the measurement. A constant cross-section of the stabilizing body is well suited for the cylindrical coils if it is arranged inside the coils.

A further development consists in that the first cylindrical coil is provided with a first ferromagnetic coil core and the second cylindrical coil is provided with a second ferromagnetic coil core, wherein the first and second coil cores are arranged longitudinally one behind the other and aligned spaced apart on the common axis.

This has the advantage that the effect of weak magnetic fields to be measured can be amplified.

According to another further embodiment, the first ferromagnetic coil core and the second ferromagnetic coil core may be embedded in the stabilizing body, the stabilizing body preferably having a longitudinal groove in which the first and second ferromagnetic coil cores are embedded, or the first and second ferromagnetic coil cores are preferably embedded completely enclosed by the material of the stabilizing body.

In this way, a defined position of the coil cores can also be achieved by the stabilizing body.

A further embodiment consists in that the first and second ferromagnetic coil cores are made of the same material and/or are formed in the same way.

In this way, a similar reinforcing effect of both coil cores can be achieved, wherein the compensation effect is then also improved, in that the opposed effects of an external magnetic field in both cylinder coils are reinforced identically.

Another further embodiment consists in that a first number of turns of the first cylindrical coil is equal to a second number of turns of the second cylindrical coil; and/or wherein a first winding diameter of the first cylindrical coil is equal to a second winding diameter of the second cylindrical coil; and/or wherein a first length of the first cylindrical coil is equal to a second length of the second cylindrical coil; and/or wherein an inductance of the first cylindrical coil and an inductance of the second cylindrical coil are equal.

These measures further improve the correspondence of the impact of the two cylindrical coils on the measurement.

According to another further embodiment, the first winding direction may be clockwise and the second winding direction may be counterclockwise, or the first winding direction may be counterclockwise and the second winding direction may be clockwise.

A further development consists in that the coil arrangement may comprise a coil winding of a winding wire having a first sub-coil winding as a first cylindrical coil and a second sub-coil winding as a second cylindrical coil, wherein the first sub-coil winding has the first winding direction and the second sub-coil winding has the second winding direction.

In this way, the coil arrangement can be formed by winding a winding wire (e.g. enameled copper wire). Only the winding direction changes in a transition area between the first and second sub-coil winding.

This can be further illustrated in that the coil winding is wound on the stabilizing body as a winding body for winding the winding wire.

The winding body may have positioning elements for positioning the coil arrangement. By using the positioning elements, there can be defined a length of the coil winding or a position of the first and second sub-coil winding, respectively, and/or the coil arrangement can be fixed/positioned therewith in a measurement region, for example on a printed circuit board or on a housing of a measuring device.

The invention also relates to a measuring device comprising a coil arrangement according to the invention or one of its further embodiments, and an AC voltage module for generating an AC voltage; wherein an AC voltage can be applied to the coil arrangement by electrically connecting opposing ends of the first and second cylindrical coils to the AC voltage module.

Provision may be made for the measuring device to detect a magnetic field.

Here, the AC voltage can be greater than 1 kHz, preferably in the range of 1 kHz to 1 GHz, and most preferably in the range of 10 kHz to 1 GHz.

These areas are well suited for the detection of a magnetic measurement field and the compensation of an external magnetic field.

The invention further relates to a torque sensor comprising: a magnetized shaft, a magnetized disc or a magnetized spoke of a spoke wheel to which a torque can be applied, wherein a magnetic field which varies as a function of the applied torque can be generated outside the shaft, the disc or the spoke; and a measuring device according to the invention or one of its further developments for detecting the generated magnetic field.

The invention further provides a device comprising a torque sensor according to the invention, wherein the device may be a vehicle, a robotic device, a bottom bracket, or an e-bike.

The above-mentioned object is also solved by a method of manufacturing a coil arrangement. The method comprises providing a first cylindrical coil having a first winding direction and a second cylindrical coil having a second winding direction longitudinally aligned in series on a common axis; wherein mutually adjacent ends of the first and second cylindrical coils are electrically connected to each other on the common axis; and wherein the second winding direction is opposed to the first winding direction. In this regard, providing the first and second cylindrical coils comprises either (i) winding a winding wire to form a coil winding having a first sub-coil winding as the first cylindrical coil and a second sub-coil winding as the second cylindrical coil, the first sub-coil winding being wound with a first winding direction and the second sub-coil winding being wound with a second winding direction, the winding with the second winding direction being opposed to the winding with the first winding direction or (ii) providing a respective separate first cylindrical coil having said first winding direction and a second cylindrical coil having said first winding direction; and electrically connecting ends of said first and second cylindrical coils adjacent to each other on said common axis.

The method according to the invention can be further illustrated by providing a stabilizing body for stabilizing the alignment of the first and second cylindrical coils with respect to each other on the common axis, in particular also as a winding body for winding the winding wire for alternative (i).

Further, for alternative (i), provision may be made for embedding a first coil core and a second coil core within the stabilizing body, wherein the first coil core is at least partially within the first sub-coil winding and the second coil core is at least partially within the second sub-coil winding.

The advantages of the method according to the invention or its further developments correspond to those mentioned above for the device according to the invention or its further developments.

Further features and exemplary embodiments as well as advantages of the present invention are explained in more detail below with reference to the drawings. It is understood that the embodiments are not exhaustive with respect to the scope of the present invention. It is further understood that some or all of the features described below may also be combined in other ways.

DETAILED DESCRIPTION

Figure 1:
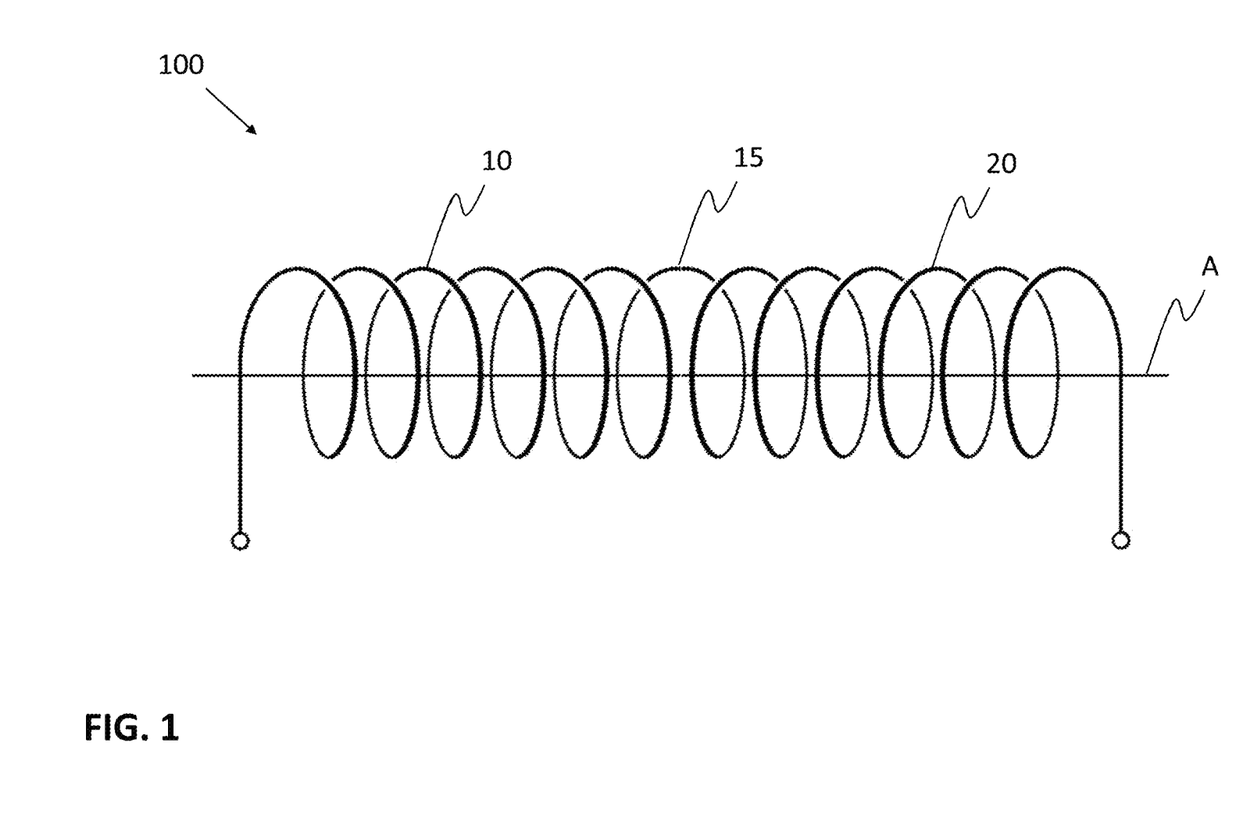
FIG. 1 shows a first embodiment of the coil arrangement according to the invention.

FIG. 1 shows a first embodiment 100 of the coil arrangement according to the invention.

The coil arrangement 100 according to the invention comprises a first cylindrical coil 10 with a first winding direction (clockwise); a second cylindrical coil 20 with a second winding direction (counterclockwise); wherein the first cylindrical coil 10 and the second cylindrical coil 20 are arranged longitudinally one behind the other aligned on a common axis A; wherein mutually adjacent ends 15 of the first cylindrical coil 10 and second cylindrical coil 20 are electrically connected to one another; and wherein the second winding direction (counterclockwise) is opposite to the first winding direction (clockwise). The direction of the first cylindrical coil 10 is a mirror image of the direction of the second cylindrical coil 20.

The first winding direction can be clockwise and the second winding direction can be counterclockwise, or the first winding direction can be counterclockwise and the second winding direction can be clockwise.

For example, a measuring device can be connected to the outer ends of the coil arrangement 100 to provide a measuring voltage, so that the coil arrangement 100 is part of an oscillating circuit that is influenced by magnetic fields present in the coil region.

Due to the different direction of the first cylinder coil 10 and second cylinder coil 20, there is no need to contact the measuring device at the middle ends 15 of the two cylinder coils 10, 20.

For example, in this embodiment and those described below, a first number of turns of the first cylindrical coil 10 is equal to a second number of turns of the second cylindrical coil 20; a first winding diameter of the first cylindrical coil 10 is equal to a second winding diameter of the second cylindrical coil 20; a first length of the first cylindrical coil 10 is equal to a second length of the second cylindrical coil 20. One or a plurality (in particular all) of these measures further improve the correspondence of the impact of the two cylindrical coils on the measurement. Additionally or alternatively, an inductance of the first cylindrical coil 10 may be equal to an inductance of the second cylindrical coil 20.

Figure 2:
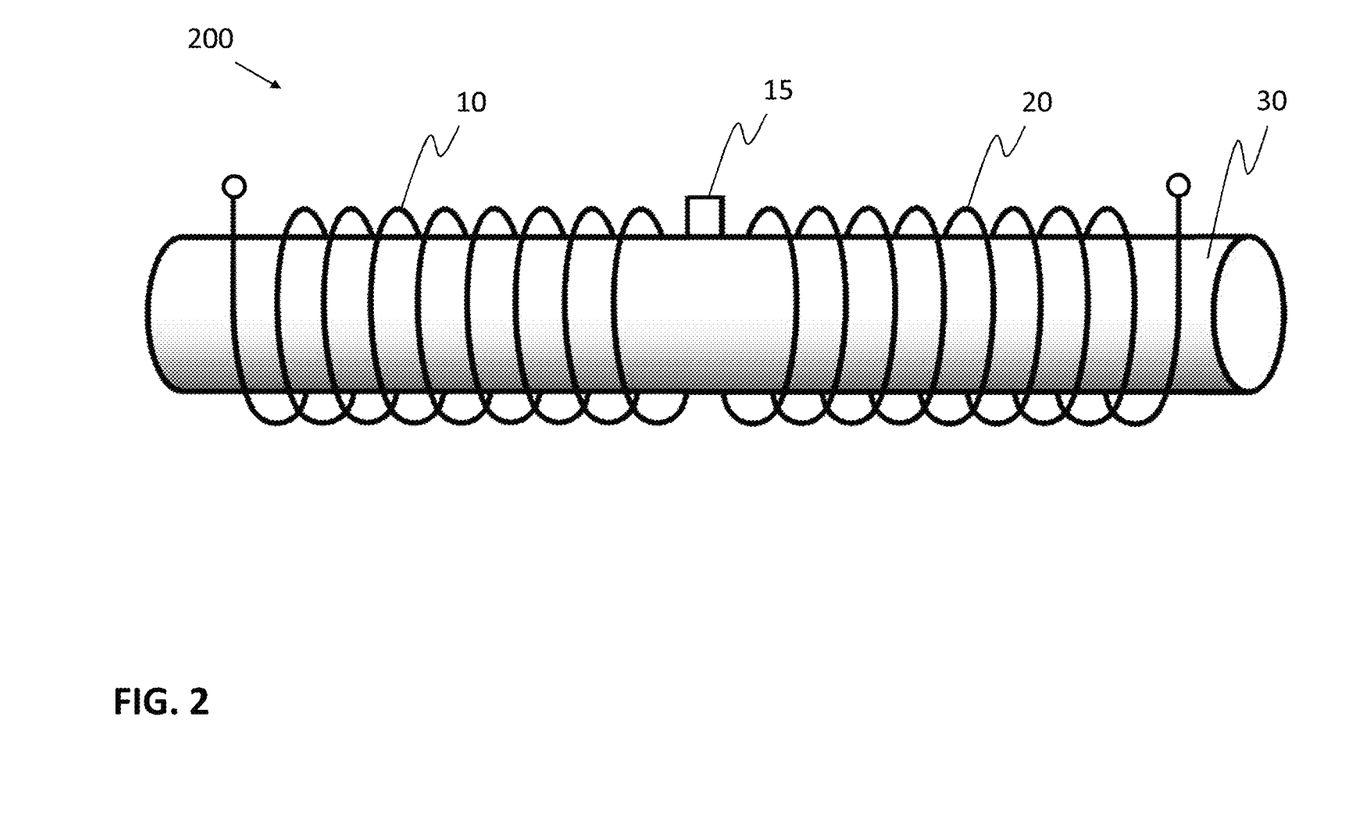
FIG. 2 shows a second embodiment of the coil arrangement according to the invention.

FIG. 2 shows a second embodiment 200 of the coil arrangement according to the invention.

The coil arrangement 200 of this second embodiment corresponds to that of the first embodiment according to FIG. 1, further comprising a stabilizing body 30 for stabilizing the alignment of the first and second cylindrical coils 10, 20 with respect to each other on the common axis A. The stabilizing body 30 is made of plastic material, for example. The stabilizing body 30 preferably has a constant cross-section along its length. The stabilizing body 30 contacts the first cylindrical coil 10 and the second cylindrical coil 20 and is shown spaced apart in the drawing only to illustrate the arrangement.

Figure 3:
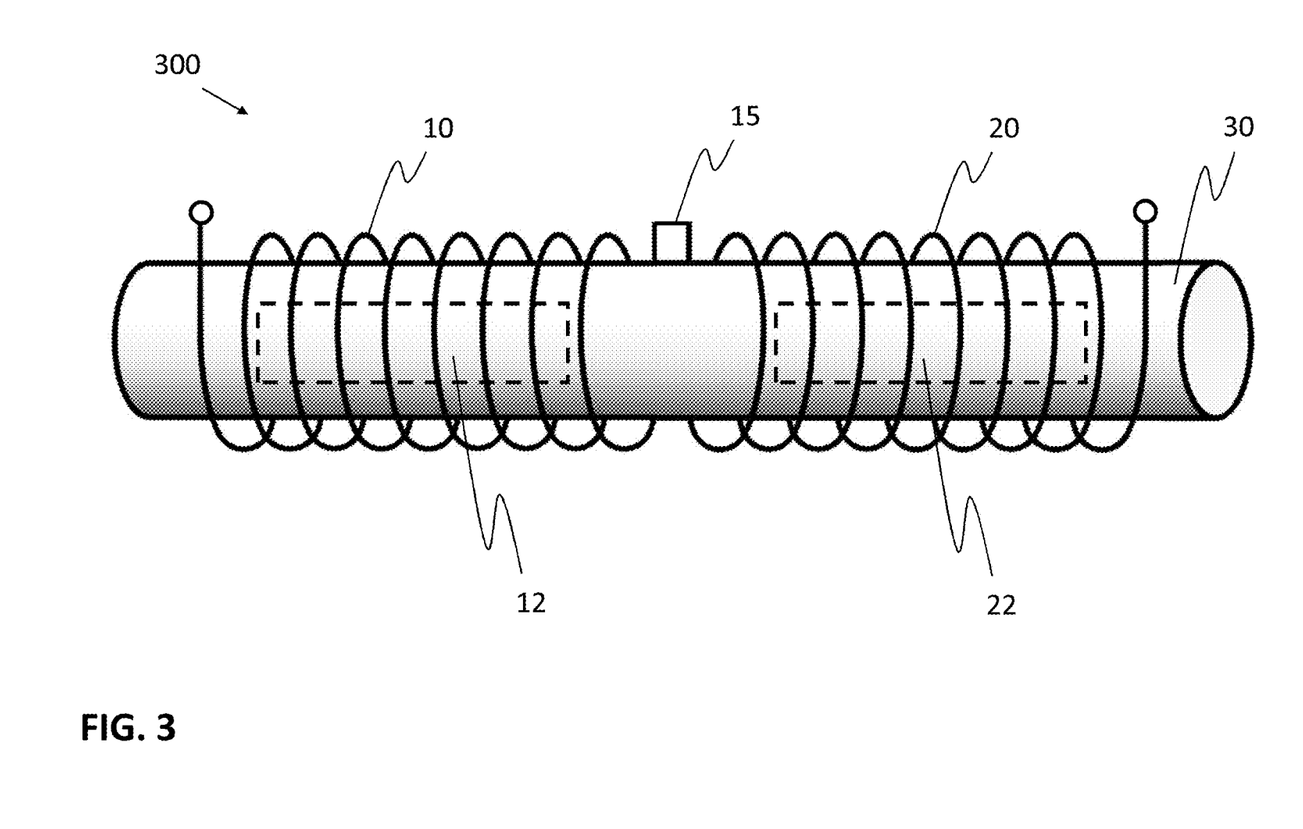
FIG. 3 shows a third embodiment of the coil arrangement according to the invention.

FIG. 3 shows a third embodiment 300 of the coil arrangement according to the invention.

The coil arrangement 300 of this second embodiment corresponds to that of the second embodiment according to FIG. 2, wherein the first cylindrical coil 10 is provided with a first ferromagnetic coil core 12 and the second cylindrical coil 20 is provided with a second ferromagnetic coil core 22, wherein the first coil core 12 and the second coil core 22 are arranged longitudinally one behind the other and aligned spaced apart on the common axis (see also FIG. 1).

The coil cores 12, 22 preferably comprise a (highly permeable) ferromagnetic material to enhance existing magnetic fields and increase the sensitivity of the coil arrangement as a measuring coil.

Figure 4:
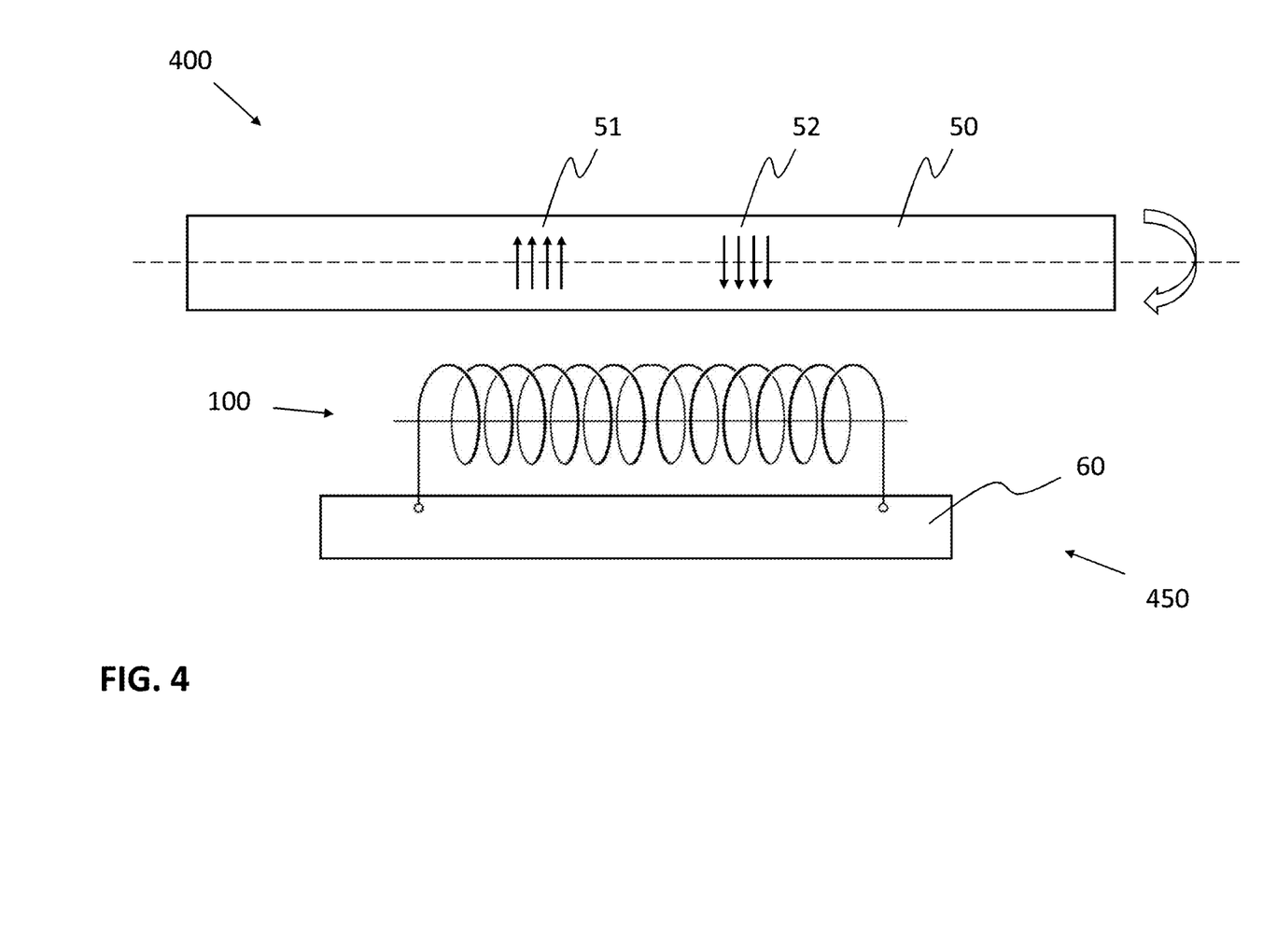
FIG. 4 shows an embodiment of the measuring device according to the invention and an embodiment of the torque sensor according to the invention.

FIG. 4 shows an embodiment of the measuring device 450 according to the invention and an embodiment 400 of the torque sensor according to the invention.

In this example, the measuring device 450 according to the invention comprises a coil arrangement 100 (or a coil arrangement 200, 300) according to the invention, and an AC voltage module 60 for generating an AC voltage. An AC voltage may be applied to the coil arrangement 100 (200, 300) by electrically connecting opposite ends of the first and second cylindrical coils to the AC voltage module 60.

Provision may be made for the measuring device 450 to detect a magnetic field. Here, the applied AC voltage can be greater than 1 kHz, preferably in the range of 1 kHz to 1 GHz, and most preferably in the range of 10 kHz to 1 GHz. A resonant circuit of the measuring device 450 is affected by the magnetic field at the coil arrangement, so that a measurement of the field can be made.

The torque sensor 400 according to the invention comprises a magnetized shaft 50 with oppositely magnetized regions 51, 52 in the circumferential direction, wherein a torque can be applied to the shaft 50, wherein a magnetic field which varies as a function of the applied torque is generated outside the shaft 50; and the measuring device 450 according to the invention for detecting the generated magnetic field.

In an alternative, instead of the magnetized shaft 50, a magnetized disk with different magnetization directions can be used, as described for example in the European Patent Application No. 21 183 622.6.

The torque sensor 400 according to the invention can be used, for example, in a group such as a vehicle, an e-bike, in particular a bottom bracket therein, or a robotic device.

Figure 5:
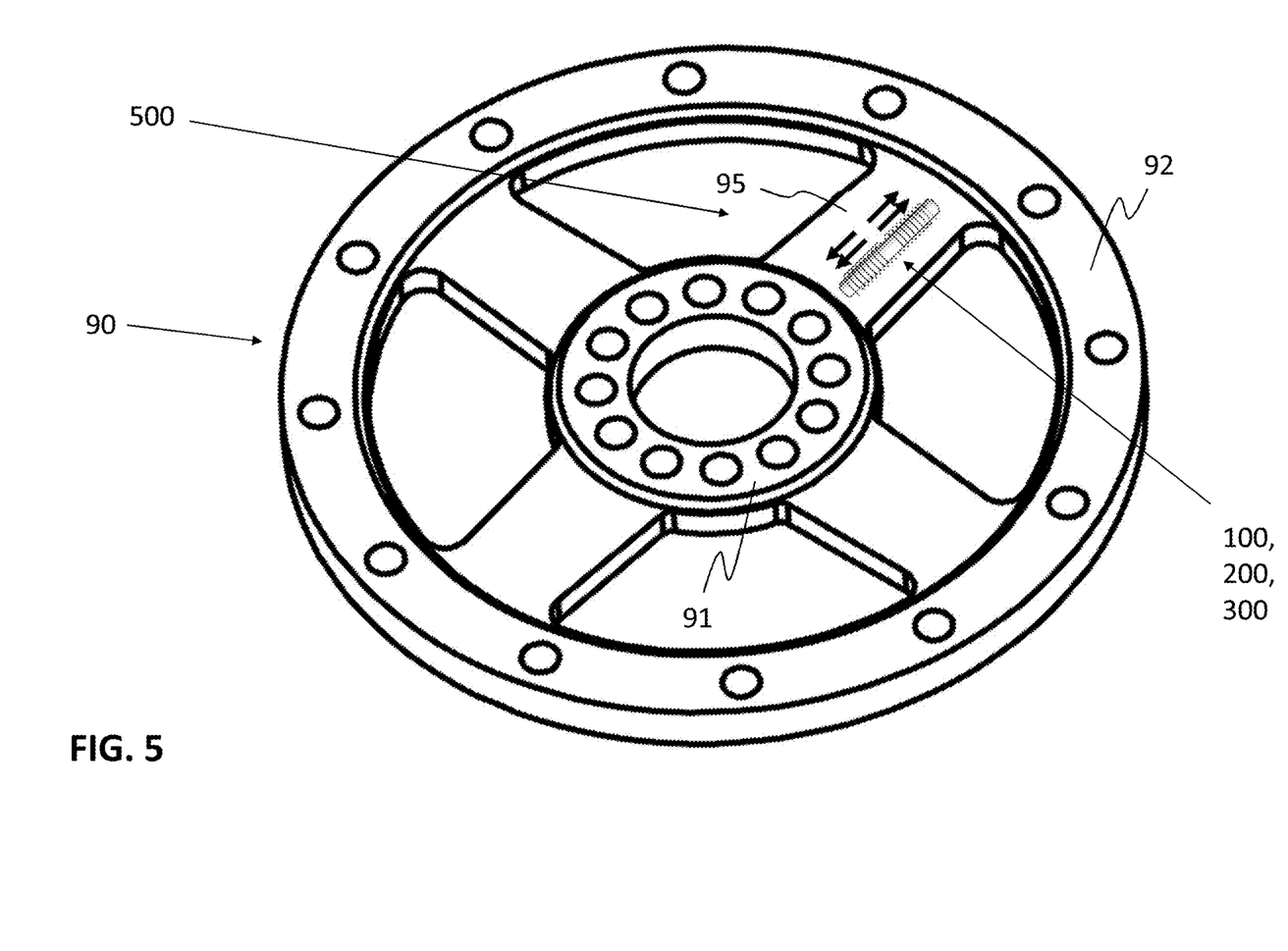
FIG. 5 shows a further embodiment of a torque sensor according to the invention.

FIG. 5 shows a further embodiment of a torque sensor according to the invention 500.

In this embodiment of the torque sensor 500, a spoke 95 of a spoke wheel 90 is magnetized, in this example within two radially offset regions of the spoke 95, and magnetized therein in opposite radial directions respectively. The spoked wheel 95 may be substantially in the form of a disc. A torque may be applied to the spoke wheel 90 between an inner portion 91 of the spoke wheel 90 to an outer portion 92 of the spoke wheel 90 by means of force transmitting elements attachable thereto. This torque causes a magnetic field change.

The torque sensor 500 further comprises a measuring device for detecting the changed magnetic field with a coil arrangement 100, 200, 300 provided at the magnetized radial regions of the spoke 95, wherein the coil arrangement 100, 200, 300 may be formed according to any of the previously described embodiments.

Figure 6:
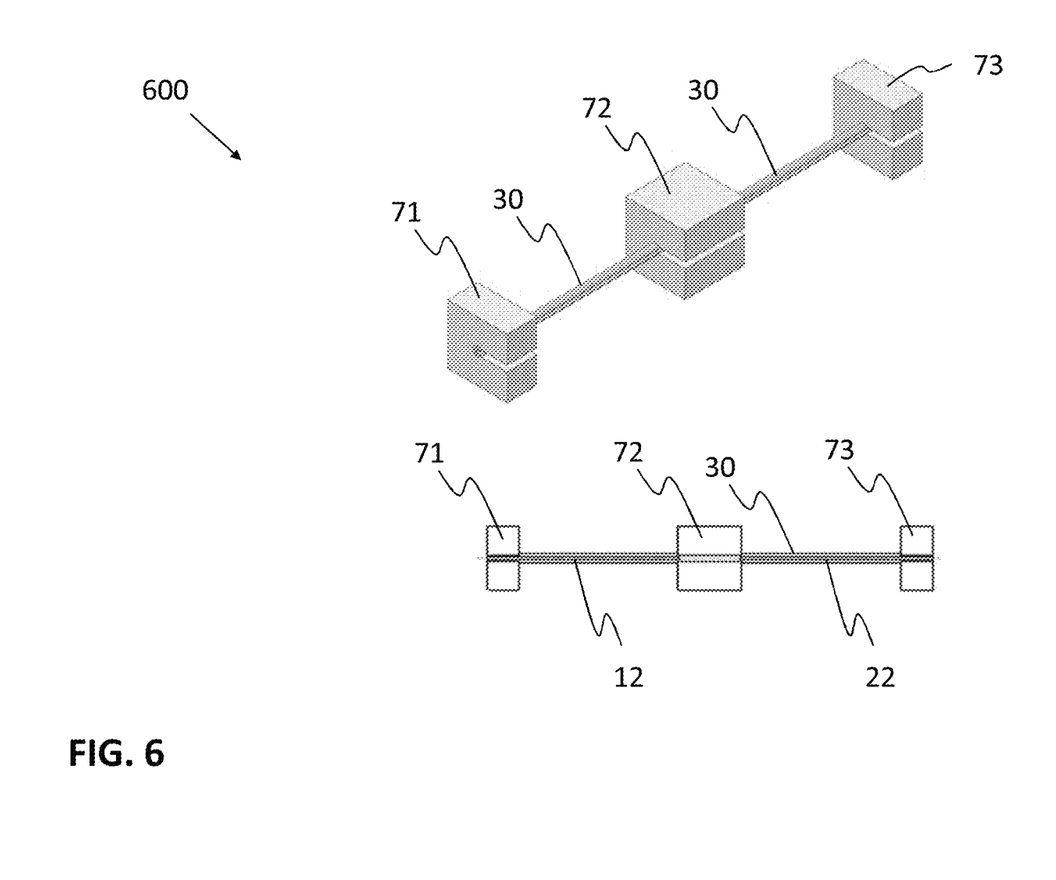
FIG. 6 shows a winding body for manufacturing a coil arrangement according to the invention.

FIG. 6 shows a winding body 600 for manufacturing a coil arrangement according to the invention.

One way to provide a coil arrangement according to the invention is to make a coil winding from a winding wire having a first sub-coil winding as a first cylindrical coil and a second sub-coil winding as a second cylindrical coil, wherein the first sub-coil winding has the first winding direction and the second sub-coil winding has the second winding direction. In this way, the coil arrangement can be formed by winding a winding wire (e.g. enameled copper wire). Only the winding direction changes in a transition area between the first and second sub-coil winding.

The coil wrap may be wound on the winding body 600 shown in FIG. 6 for winding the winding wire. The winding body 600 also includes the stabilizing element 30 with the ferromagnetic cores 12, 22.

The winding body 600 further comprises positioning elements 71, 72, 73 for positioning the coil arrangement. By using the positioning elements 71, 72, 73, a length of the coil winding or a position of the first and second sub-coil winding can be defined by winding the first sub-coil winding in the region between the positioning elements 71 and 72 in a first winding direction (counterclockwise or clockwise) and winding the second sub-coil winding between the positioning elements 72 and 73 in a second winding direction (clockwise or counterclockwise), which is opposed to the first winding direction. In the transition area with the positioning element 72, the winding wire is passed through in a straight line. The winding wire can protrude from the end portions with the positioning elements 71, 73 so that they can serve as contact points for connecting to a measuring circuit.

Furthermore, the finished coil arrangement with the positioning elements 71, 72, 73 can be fixed/positioned in a designated measuring area of a device, for example on a circuit board or on a housing of a measuring device.

The method according to the invention in this example comprises winding a winding wire to produce a coil winding having a first sub-coil winding as the first cylindrical coil and a second sub-coil winding as the second cylindrical coil, the first sub-coil winding being wound with a first winding direction and the second sub-coil winding being wound with a second winding direction, the winding with the second winding direction being opposed to the winding with the first winding direction.

Further, provision is made in this embodiment for embedding a first and a second coil core 12, 22 within the stabilizing body 30, wherein the first coil core 12 is at least partially within the first sub-coil winding and the second coil core 22 is at least partially within the second sub-coil winding.

The stabilizing body 30 can, for example, have a longitudinal groove in which the first and second ferromagnetic coil cores 12, 22 are embedded, or the first and second ferromagnetic coil cores 12, 22 can be embedded completely enclosed by the material of the stabilizing body, in particular cast therein.

The embodiments shown are merely exemplary and the full scope of the present invention is defined by the claims.

What is claimed is:

1. A coil arrangement for detecting a magnetic field, comprising:
    a first cylindrical coil with a first winding direction; and
    a second cylindrical coil with a second winding direction,
    wherein first and second cylindrical coils are arranged longitudinally one behind another aligned on a common axis,
    wherein mutually adjacent ends of the first and second cylindrical coils are electrically connected to each other,
    wherein the second winding direction is opposed to the first winding direction, and
    wherein the first cylindrical coil is provided with a first ferromagnetic coil core and the second cylindrical coil is provided with a second ferromagnetic coil core, wherein first and second coil cores are arranged longitudinally one behind another and aligned spaced apart on the common axis.

2. The coil arrangement of claim 1 further comprising a stabilizing body for stabilizing alignment of the first and second cylinder coils with respect to each other on the common axis, wherein the stabilizing body is preferably made of plastic material, and wherein the stabilizing body preferably has a constant cross-section along its length.

3. The coil arrangement of claim 1, wherein the first ferromagnetic coil core and the second ferromagnetic coil core are embedded in a stabilizing body, the stabilizing body having a longitudinal groove in which the first and second ferromagnetic coil cores are embedded, or
    wherein the first and second ferromagnetic coil cores are embedded completely enclosed by a material of the stabilizing body.

4. The coil arrangement of claim 1, wherein the first and second ferromagnetic coil cores are one or both of made of a same material and formed the same.

5. The coil arrangement of claim 1, wherein one or more of:
    a first number of turns of the first cylindrical coil is equal to a second number of turns of the second cylindrical coil;
    a first winding diameter of the first cylindrical coil is equal to a second winding diameter of the second cylindrical coil;
    a first length of the first cylindrical coil is equal to a second length of the second cylindrical coil; and
    an inductance of the first cylindrical coil and an inductance of the second cylindrical coil are equal.

6. The coil arrangement of claim 1, wherein the first winding direction is clockwise and the second winding direction is counterclockwise, or wherein the first winding direction is counterclockwise and the second winding direction is clockwise.

7. The coil arrangement of claim 1, wherein the coil arrangement comprises a coil winding of a winding wire having a first sub-coil winding as a first cylindrical coil and a second sub-coil winding as a second cylindrical coil, wherein the first sub-coil winding has the first winding direction and the second sub-coil winding has the second winding direction.

8. The coil arrangement of claim 7, wherein the coil winding is wound on a stabilizing body as a winding body for winding the winding wire.

9. A measuring device comprising the coil arrangement of claim 1, and further comprising:
    an AC voltage module for generating an AC voltage,
    wherein the AC voltage is configured to be applied to the coil arrangement by electrically connecting opposite ends of the first and second cylindrical coils to the AC voltage module.

10. The measuring device of claim 9, wherein the measuring device is provided for detecting a magnetic field.

11. The measuring device of claim 9, wherein the AC voltage is greater than 1 kHz.

12. A torque sensor, comprising:
    a magnetized shaft, a magnetized disk or a magnetized spoke of a spoke wheel to which a torque is applied, wherein a magnetic field which varies as a function of applied torque can be generated outside the magnetized shaft, the magnetized disk or the magnetized spoke; and the measuring device according to claim 9 for detecting a generated magnetic field.

13. A device comprising the torque sensor of claim 12, wherein the device is selected from a group comprising a vehicle, a robotic device, a bottom bracket, an e-bike.

* * * * *